(12) United States Patent
Lacko

(10) Patent No.: US 10,093,429 B2
(45) Date of Patent: Oct. 9, 2018

(54) LATCH BEAM DEFLECTION SUPPORT

(71) Applicant: ROHR, INC., Chula Vista, CA (US)

(72) Inventor: Anthony Lacko, San Diego, CA (US)

(73) Assignee: ROHR, INC, Chula Vista, CA (US)

( * ) Notice: Subject to any disclaimer, the term of this patent is extended or adjusted under 35 U.S.C. 154(b) by 383 days.

(21) Appl. No.: 14/793,024

(22) Filed: Jul. 7, 2015

(65) Prior Publication Data

US 2017/0008634 A1    Jan. 12, 2017

(51) Int. Cl.
*F16M 11/00* (2006.01)
*B64D 29/06* (2006.01)
*B64D 29/02* (2006.01)

(52) U.S. Cl.
CPC ............. *B64D 29/06* (2013.01); *B64D 29/02* (2013.01)

(58) Field of Classification Search
CPC ................................ F16M 13/00; B64D 29/06
See application file for complete search history.

(56) References Cited

U.S. PATENT DOCUMENTS

| | | |
|---|---|---|
| 5,239,822 A | 8/1993 | Buchacher |
| 5,251,435 A | 10/1993 | Pauley |
| 5,369,954 A | 12/1994 | Stuart |
| 6,340,135 B1 | 1/2002 | Barton |
| 7,730,715 B2 | 6/2010 | Grudnoski et al. |
| 8,181,905 B2 | 5/2012 | McDonough et al. |
| 8,789,355 B2 | 7/2014 | Elegoet |
| 8,869,507 B2 | 10/2014 | Cloft et al. |
| 8,956,109 B2 * | 2/2015 | Regard ............ B64D 29/08 415/126 |
| 9,567,089 B2 * | 2/2017 | Layland ............ B64D 27/26 |
| 2010/0229526 A1 | 9/2010 | Germain et al. |
| 2012/0248284 A1 | 10/2012 | Bellanger et al. |
| 2013/0019609 A1 | 1/2013 | Wong et al. |
| 2013/0062462 A1 | 3/2013 | Bellanger et al. |
| 2014/0030087 A1 | 1/2014 | Soria et al. |

FOREIGN PATENT DOCUMENTS

EP    2690018 A2    1/2014

* cited by examiner

*Primary Examiner* — Amy J. Sterling

(74) *Attorney, Agent, or Firm* — Cantor Colburn LLP

(57) ABSTRACT

An engine nacelle is provided and includes an outer fixed structure (OFS) assembly disposed about an inner fixed structure (IFS) barrel and a latch beam, which is separate from the IFS barrel along an entire length thereof. The latch beam includes forward and trailing ends directly and indirectly supportively coupled to the OFS assembly, respectively.

11 Claims, 5 Drawing Sheets

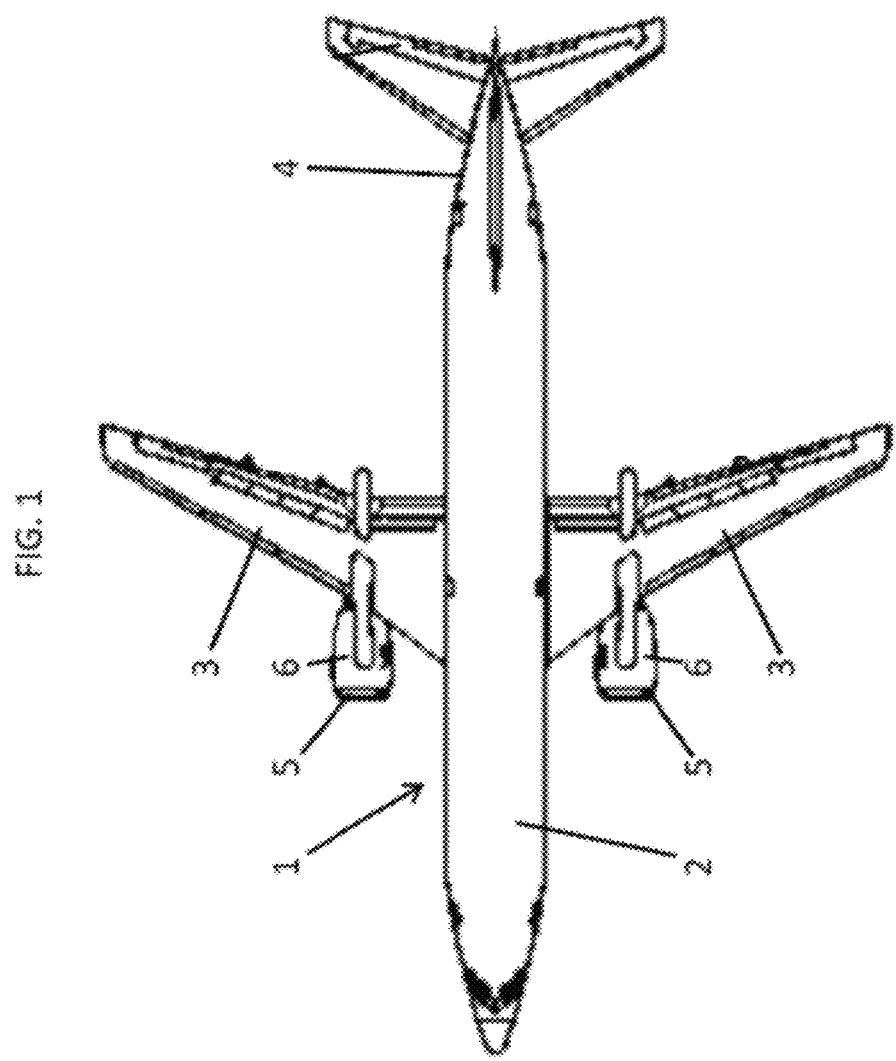

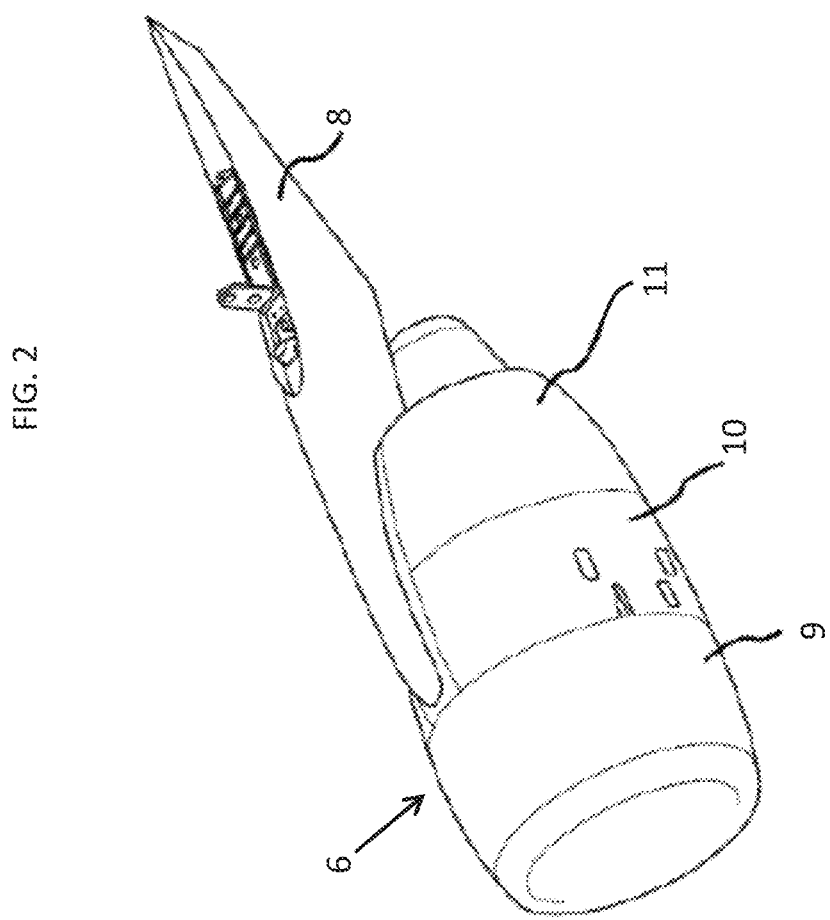

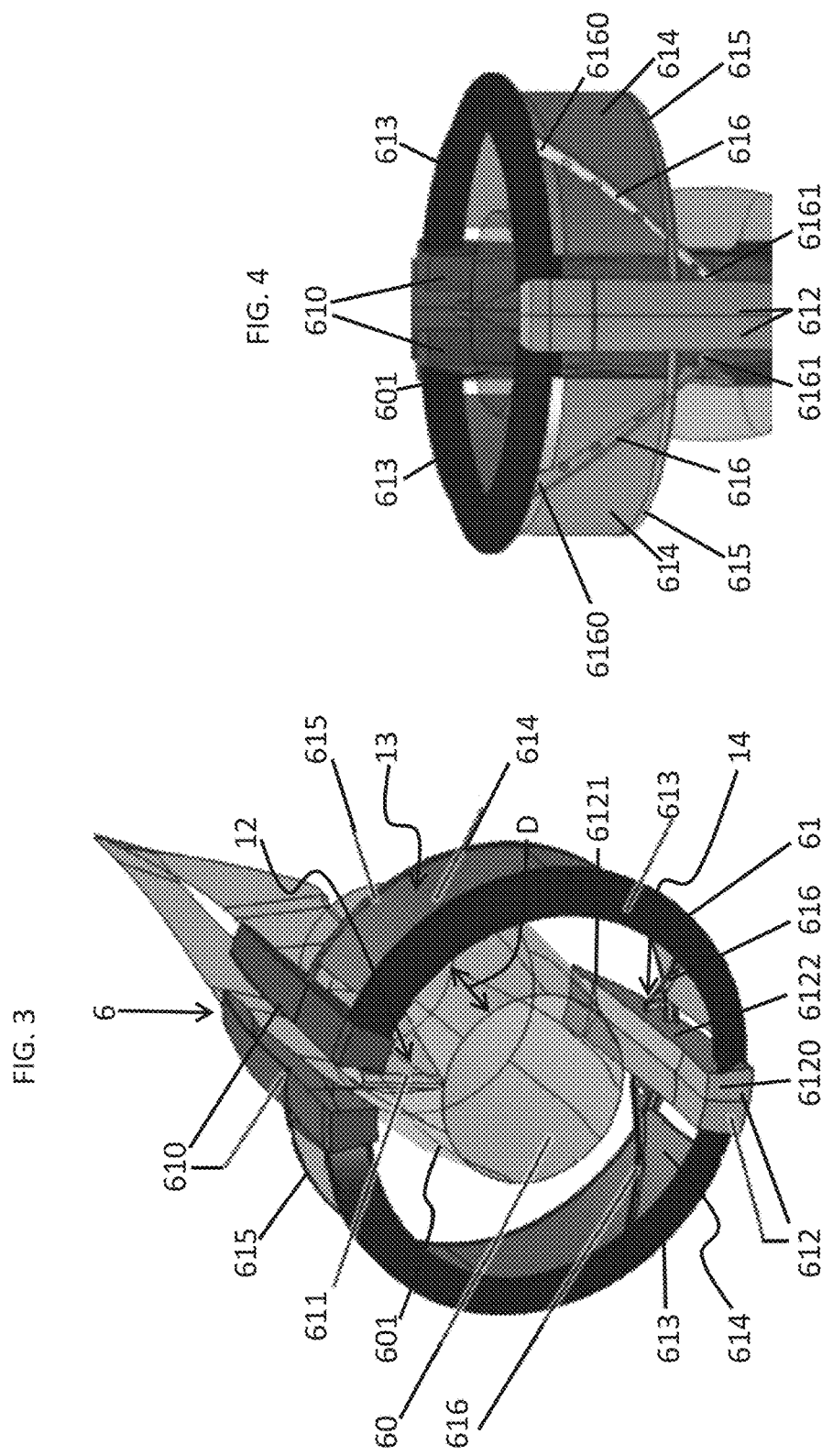

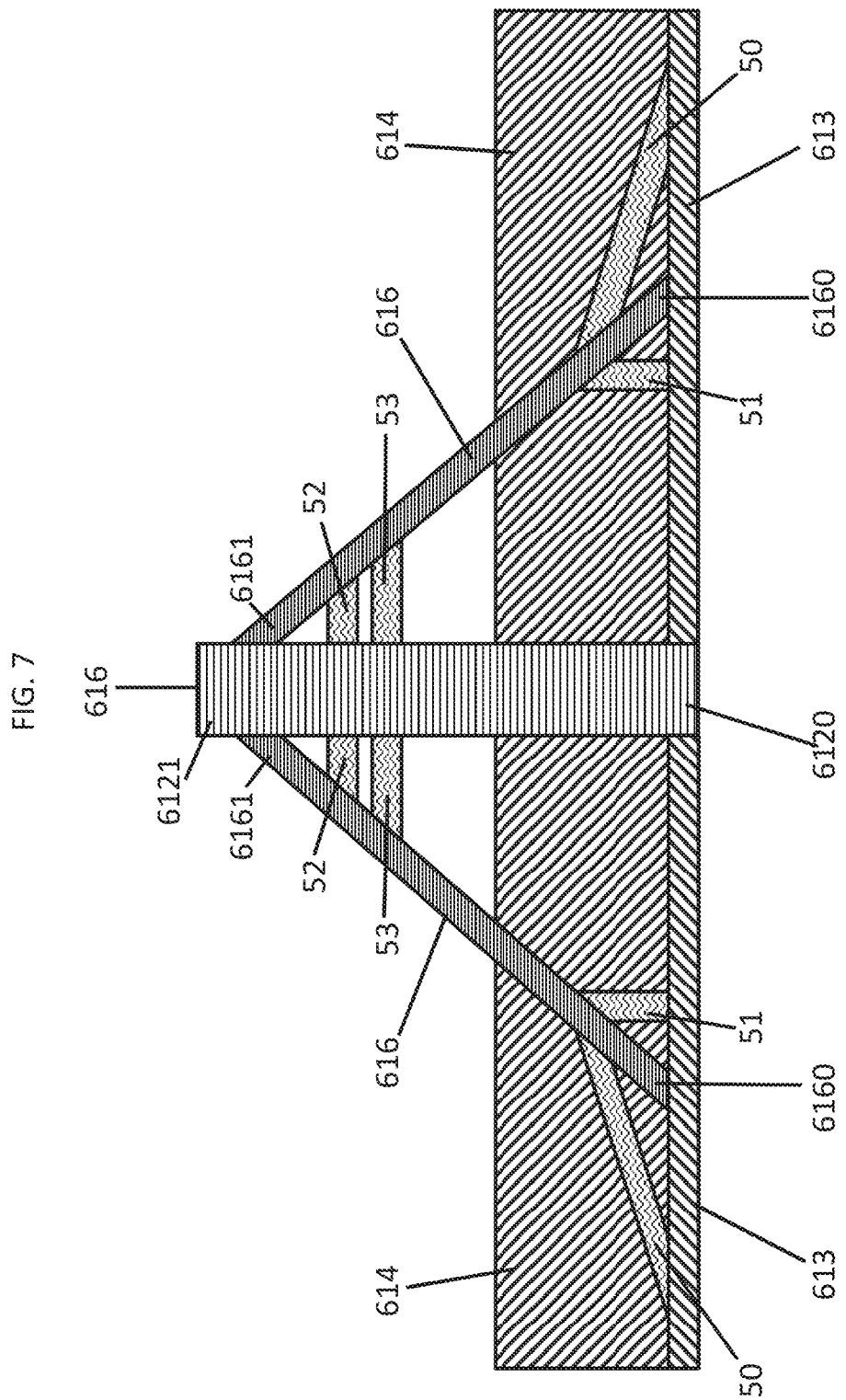

LATCH BEAM DEFLECTION SUPPORT

BACKGROUND OF THE DISCLOSURE

The subject matter disclosed herein relates to a thrust reverser or other bypass duct structure for a turbofan aircraft engine, and, more particularly, to a latch beam deflection support.

Modern aircraft, such as commercial jets, include a fuselage that is formed to define a cabin and a cockpit. The fuselage has a nose cone section and a tail section, wings extending outwardly from the fuselage and a tail at the tail section of the fuselage. Thrust for the aircraft is generated by engines that are positioned within engine nacelles and typically either attach to the undersides of the wings, or the sides of the fuselage near the rear of the plane, or are built into the tail. The engines include an air inlet, a compressor to compress inlet air, a combustor in which fuel is mixed with compressed inlet air and combusted to produce a working fluid and a turbine in which the working fluid is expanded. The engines further include an outlet through which the working fluid is exhausted to generate the thrust.

The engine nacelles may include an inner fixed structure (IFS), which generally surrounds and provides an aerodynamic fairing for a portion of the engine and certain auxiliary devices including ducts that carry fluids to and from the engine sections and auxiliary devices and to the airplane. The engine nacelles further include several structures disposed radially outwardly of the IFS, some of which help define, along with the inner fixed structure, a fan duct for fan bypass air in a turbofan engine. During operations of each of the engines, air generally moves through each of the engines in a core flow stream and a fan flow stream. The core flow stream moves through a core of the engine inside the IFS and the fan flow stream moves through the fan duct.

While bifurcations in the fan duct serve many purposes, including providing a path for systems routing and structural stability of the engine nacelles, their presence may cause or generate drag. As such, there have been proposals for removing a lower bifurcation to reduce drag in the fan flow stream. But, in-service deflections at the aft end of the latch beam (i.e., at a point furthest from the torque box) must be managed in a different fashion absent the lower bifurcation which, when present, lends structural support.

BRIEF DESCRIPTION OF THE DISCLOSURE

According to one aspect of the disclosure, an engine nacelle is provided and includes an outer fixed structure (OFS) assembly disposed about an inner fixed structure (IFS) barrel and a latch beam, which is separate from the IFS barrel along an entire length thereof. The latch beam includes forward and trailing ends directly and indirectly supportively coupled to the OFS assembly, respectively.

In accordance with additional or alternative embodiments, the engine nacelle further includes a support member by which the trailing end of the latch beam is indirectly supportively coupled to the OFS assembly.

In accordance with additional or alternative embodiments, the support member is provided as first and second support members disposed on either side of the latch beam.

In accordance with additional or alternative embodiments, the support member has a C-channel cross-sectional shape.

In accordance with additional or alternative embodiments, the support member has at least one curved section disposed along a longitudinal length thereof.

In accordance with additional or alternative embodiments, the support member includes multiple first branches at the first end, which are respectively coupled to the OFS assembly and multiple second branches at the second end, which are respectively coupled to the trailing end of the latch beam.

According to another aspect of the disclosure, an engine nacelle is provided and includes an outer fixed structure (OFS) assembly disposed about an inner fixed structure (IFS) barrel, a latch beam including a forward end coupled to the OFS assembly and a trailing end disposed aft of a direct connection between the forward end of the latch beam and the OFS assembly and a support member. The support member includes a first end coupled to the OFS assembly and a second end coupled to the trailing end of the latch beam.

In accordance with additional or alternative embodiments, the latch beam is separate from the IFS barrel along an entire length thereof.

In accordance with additional or alternative embodiments, the support member is provided as first and second support members disposed on either side of the latch beam.

In accordance with additional or alternative embodiments, the support member has a C-channel cross-sectional shape.

In accordance with additional or alternative embodiments, the support member has at least one curved section disposed along a longitudinal length thereof.

In accordance with additional or alternative embodiments, the support member includes multiple first branches at the first end, which are respectively coupled to the OFS assembly and multiple second branches at the second end, which are respectively coupled to the trailing end of the latch beam.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 1 is a top down illustration of an aircraft in accordance with embodiments;

FIG. 2 is a perspective view of an engine nacelle of the aircraft of FIG. 1;

FIG. 3 is a perspective view of components of the engine nacelle of FIG. 2;

FIG. 4 is another perspective view of components of the engine nacelle of FIG. 2;

FIG. 7 is a top down view of support members of a latch beam support assembly in accordance with further embodiments.

Figure 5:
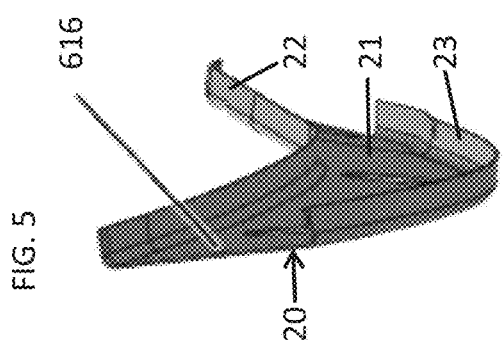
FIG. 5 is a perspective view of a support member of a latch beam support assembly in accordance with embodiments.

The detailed description explains embodiments of the disclosure, together with advantages and features, by way of example with reference to the drawings.

DETAILED DESCRIPTION OF THE DISCLOSURE

As will be described below, a support beam assembly is provided for use in an engine nacelle of an aircraft and includes a support beam disposed between a latch beam and a torque box of an outer fixed structure (OFS). The support beam assembly serves to stiffen the latch beam and limit deflections.

With reference to FIG. 1, an aircraft 1 is provided. The aircraft 1 includes a fuselage 2, which has an aerodynamic nose cone and a trailing portion opposite the nose cone, wings 3 extending outwardly from the fuselage 2, a tail portion 4 at the trailing portion of the fuselage 2 and engines 5. The engines 5 are supported under the wings 3 and within engine nacelles 6. Other mounting locations for the engines 5 include the rear side of the fuselage 2. Alternatively, the engines 5 can be built into the tail portion 4.

With continued reference to FIG. 1 and, with additional reference to FIG. 2, each of the engine nacelles 6 may be supported from the undersides of the wings 3 directly or indirectly by a pylon 8 and includes an inlet section 9, a fan cowl section 10 downstream from the inlet section 9 and a thrust reverser 11 downstream from the fan cowl section 10. During certain flight operations, such as landings, the thrust reverser 11 may be deployed in the aft direction in order to slow down the aircraft 1 by redirection of exhaust from the corresponding engine 5.

With reference to FIGS. 3 and 4, the engine nacelles 6 each include an inner fixed structure (IFS) 60 and an outer fixed structure (OFS) 61 that surrounds the IFS 60 at a generally uniform radial distance D. For each engine nacelle 6, the IFS 60 surrounds one of the engines 5 as well as multiple ducts configured to transport fluids toward and away from various components of the engine 5 and includes an IFS barrel 601. The IFS barrel 601 is generally annular. The OFS 61 is disposed to surround the IFS barrel 601 and may be provided as a generally annular element with forward and aft aerodynamic tapering. The OFS 61 includes first and second hinge beam elements 610 and an IFS upper bifurcation 611 that extends from the first and second hinge beam elements 610 to the IFS barrel 601. The OFS 61 further includes first and second latch beam elements 612 that are disposed on an opposite side of the IFS barrel 601 with respect to the first and second hinge beam elements 610. The OFS 61 also includes first and second OFS torque boxes 613, and may in some cases include first and second sets of OFS cascades 614, as well as first and second OFS aft cascade rings 615 and first and second latch beam deflection support members 616.

Although some components types of the OFS 61 are described herein, it is to be understood that the OFS 61 may have different components and configurations. That is, while the illustrated and described embodiments refer to a translating sleeve and cascade style thrust reverser, the OFS 61 may be provided as a fixed duct as well. In such cases, the OFS 61 would include a fixed panel as opposed to OFS cascades or OFS cascade rings and would not have a translating sleeve or blocker doors. Thus, it is to be further understood that the illustrated and described embodiments are not limiting and are provided solely for clarity and brevity.

The first and second hinge beam elements 610 may be individually hinged to the pylon 8 of FIG. 2, for example, and each side of the OFS 61 may be able to swing open in clam-shell fashion to expose a portion of the corresponding engine 5 for maintenance work.

In any case, the first and second hinge beam elements 610 and the IFS upper bifurcation 611 may hereinafter be referred to collectively as a "bifurcation structure" 12 (see FIG. 3). The first and second OFS torque boxes 613, the first and second sets of OFS cascades 614 and the first and second OFS aft cascade rings 615 may hereinafter be referred to collectively as an "OFS assembly" 13 (see FIG. 3). The first and second latch beam deflection support members 616 may hereinafter be referred to collectively as "a latch beam support assembly" 14 (see FIG. 3).

The OFS assembly 13 is generally suspended from or supported by the first and second hinge beams elements 610 to be disposed about the IFS barrel 601. The first and second latch beam elements 612 are or may be separated from the IFS barrel 601 along an entire length thereof and have respective wide forward ends 6120, narrow tail ends 6121 and tapers that run from the forward ends 6120 to the tail ends 6121. In accordance with some, but not all embodiments, there may be no bifurcation between any part of the first and second latch beam elements 612 and the IFS barrel 601. In accordance with alternative embodiments, a lower bifurcation could be present but might not be provided as a structural or primary structural feature or may only extend for about 20-30% of its normal length. In any case, the first and second latch beam elements 612 are directly supportively coupled to the OFS assembly 13 at the forward end 6120. Conversely, the latch beam is indirectly coupled to the OFS assembly 13 at the trailing end 6121.

The first OFS torque box 613 extends from a forward end of the first hinge beam element 610 to a first side of the forward end 6120 of the first latch beam element 612 in a generally semi-annular arc. Similarly, the second OFS torque box 613 extends from a forward end of the second hinge beam element 610 to a second side of the forward end 6120 of the second latch beam element 612 in a generally semi-annular arc. In accordance with embodiments, the first OFS aft cascade ring 615 extends from a central portion of the first hinge beam element 610 to a first side of an aft portion of the forward end 6120 of the first latch beam element 612 in a generally semi-annular arc. Similarly, the second OFS aft cascade ring 615 extends from a central portion of the second hinge beam element 610 to a second side of the aft portion of the forward end 6120 of the second latch beam element 612 in a generally semi-annular arc. Thus, the first and second OFS torque boxes 613 and the first and second OFS aft cascade rings 615 are suspended from a portion of the bifurcation structure 12 and provide for some but not necessarily all of the direct supportive couplings to the first and second latch beam elements 612. The first set of the OFS cascades 614 are disposed in an annular serial array between the first OFS torque box 613 and the first OFS aft cascade ring 615 while the second set of the OFS cascades 614 are disposed in an annular serial array between the second OFS toque box 613 and the second OFS cascade ring 615.

Figure 6:
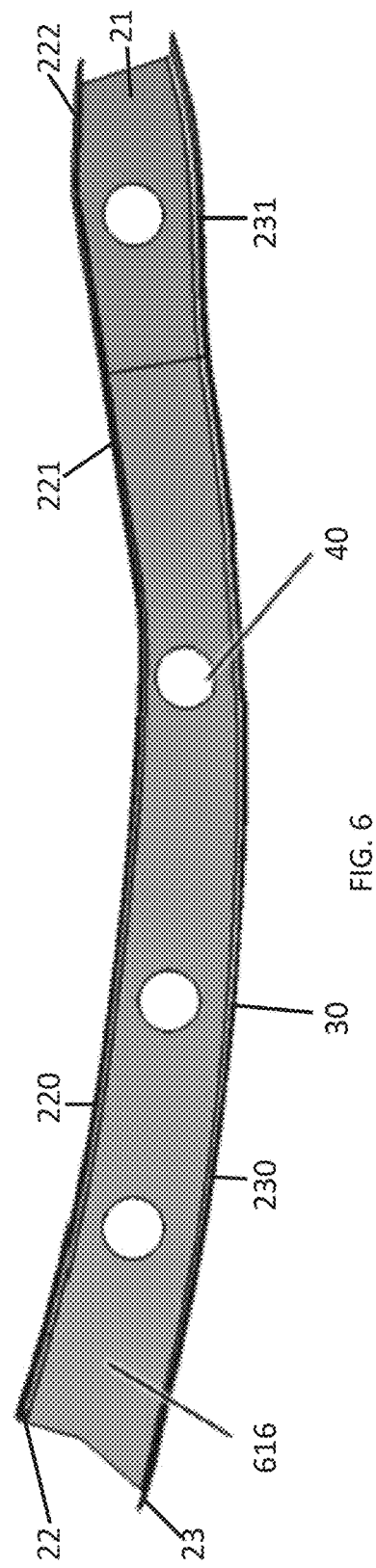
FIG. 6 is an elevation view of the support member of FIG. 5.

With continued reference to FIGS. 3 and 4 and with additional reference to FIGS. 5 and 6, each of the support members 616 may be rigid or substantially rigid and includes a first end 6160 that is coupled to a component of the OFS assembly 13 and a second end 6161 that is coupled to the trailing ends 6121 of the first and second latch beam elements 612 (as used herein, the term "trailing end(s) 6121" refers generally to any portion of the first and second latch beam elements 612 that are disposed aft of any direct connection or coupling of the first and second latch beam elements 612 to the OFS assembly 13).

In this way, the support members 616 use the annularity of the OFS assembly 13 to limit deflections of the first and second latch beam elements 612 even in the absence of a bifurcation between the first and second latch beam elements 612 and the IFS barrel 601. In addition, the support members 616 provide for increased structural stability of the engine nacelle 6 as well as a direct load path (in some cases) from the trailing ends 6121 of the first and second latch beam elements 612 to the first and second OFS torque boxes 613.

As shown in FIG. 4, the support members 616 may be provided as first and second support members 616 that are respectively disposed on either side of the first and second latch beam elements 612. More particularly, the support members 616 may be provided as first and second support members 616 that are respectively disposed symmetrically about the first and second latch beam elements 612. That is, the first and second support members 616 may each be coupled with the first and second latch beam elements 612 at similar axial locations of the first and second latch beam elements 612 and may form similar angles with the first and second latch beam elements 612. Also, the first and second support members 616 may be rigidly or rotatably coupled to the OFS assembly 13 and to the first and second latch beam elements 612 (e.g., by a weld joint in the case of the rigid connection or by a pin connection in the case of the rotatable connection).

In accordance with embodiments and, with reference to FIGS. 5 and 6, each support member 616 may be formed of one or more materials, such as metallic, composite or thermoplastic materials and may optionally have a C-channel cross-sectional shape 20, at least one curved section 30 disposed along a longitudinal length thereof and may be formed to define through-holes 40 for maintenance of a relatively light support member 616 weight. As to the C-channel cross-sectional shape 20, as shown in FIG. 5, the support member 616 may include a spine portion 21 and first and second flanges 22 extending transversely from opposite sides of the spine portion 21 to add rigidity to the overall structure of the support member 616.

With reference to FIG. 7 and, in accordance with further embodiments, each support member 616 may include multiple first branches 50 and 51 at the first end 6160 and multiple second branches 52 and 53 at the second end 6161. More particularly, where a support member 616 includes the multiple first branches 50 and 51, the multiple first branches 50 and 51 may extend in the same or in opposite directions from the support member 616 and be coupled to the corresponding one of the first and second OFS torque boxes 613. Similarly, where a support member 616 includes the multiple second branches 52 and 53, the multiple second branches 52 and 53 may be coupled to the corresponding trailing end 6121 of the first and second latch beam elements 612.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

I claim:

1. An engine nacelle, comprising:
    an inner fixed structure (IFS) comprising a barrel and an upper bifurcation at an upper portion of the barrel, the IFS having an absence of a bifurcation at a lower portion of the barrel;
    an outer fixed structure (OFS) assembly disposed about the barrel of the IFS; and
    a latch beam comprising forward and trailing ends directly and indirectly supportively coupled to the OFS assembly, respectively,
    the latch beam being circumferentially located at and separated along an entire length thereof from the lower portion of the IFS barrel.

2. The engine nacelle according to claim 1, further comprising a support member by which the trailing end of the latch beam is indirectly supportively coupled to the OFS assembly.

3. The engine nacelle according to claim 2, wherein the support member is provided as first and second support members disposed on either side of the latch beam.

4. The engine nacelle according to claim 2, wherein the support member has a C-channel cross-sectional shape.

5. The engine nacelle according to claim 2, wherein the support member has at least one curved section disposed along a longitudinal length thereof.

6. The engine nacelle according to claim 2, wherein the support member comprises:
    multiple first branches at the first end, which are respectively coupled to the OFS assembly; and
    multiple second branches at the second end, which are respectively coupled to the trailing end of the latch beam.

7. An engine nacelle, comprising:
    an inner fixed structure (IFS) comprising a barrel and an upper bifurcation at an upper portion of the barrel, the IFS having an absence of a bifurcation at a lower portion of the barrel;
    an outer fixed structure (OFS) assembly disposed about the barrel of the IFS;
    a latch beam comprising a forward end coupled to the OFS assembly and a trailing end disposed aft of a direct connection between the forward end of the latch beam and the OFS assembly, the latch beam being circumferentially located at and separated along an entire length thereof from the lower portion of the IFS barrel; and
    a support member comprising a first end coupled to the OFS assembly and a second end coupled to the trailing end of the latch beam.

8. The engine nacelle according to claim 7, wherein the support member is provided as first and second support members disposed on either side of the latch beam.

9. The engine nacelle according to claim 7, wherein the support member has a C-channel cross-sectional shape.

10. The engine nacelle according to claim 7, wherein the support member has at least one curved section disposed along a longitudinal length thereof.

11. The engine nacelle according to claim 7, wherein the support member comprises:
    multiple first branches at the first end, which are respectively coupled to the OFS assembly; and
    multiple second branches at the second end, which are respectively coupled to the trailing end of the latch beam.

* * * * *